United States Patent
Franceschini et al.

(10) Patent No.: US 9,858,015 B2
(45) Date of Patent: *Jan. 2, 2018

(54) SOLID-STATE STORAGE MANAGEMENT

(71) Applicant: International Business Machines Corporation, Armonk, NY (US)

(72) Inventors: Michele M. Franceschini, White Plains, NY (US); Ashish Jagmohan, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,899

(22) Filed: Jan. 20, 2014

(65) Prior Publication Data

US 2014/0136769 A1    May 15, 2014

Related U.S. Application Data

(63) Continuation of application No. 13/336,385, filed on Dec. 23, 2011, now Pat. No. 9,740,439.

(51) Int. Cl.
*G06F 3/06* (2006.01)
*G06F 12/02* (2006.01)

(52) U.S. Cl.
CPC .......... *G06F 3/0688* (2013.01); *G06F 3/0601* (2013.01); *G06F 3/061* (2013.01);
(Continued)

(58) Field of Classification Search
CPC .... G06F 3/0601; G06F 12/0246; G06F 1/185; G06F 2212/7201
See application file for complete search history.

(56) References Cited

U.S. PATENT DOCUMENTS

| 6,012,135 A | 1/2000 | Leedom et al. |
| 6,377,500 B1 | 4/2002 | Fujimoto et al. |

(Continued)

FOREIGN PATENT DOCUMENTS

EP    2079013 A1    7/2009

OTHER PUBLICATIONS

U.S. Appl. No. 13/619,424; Non-Final Office Action; filed Sep. 14, 2012; dated Aug. 15, 2013; pp. 1-25.
U.S. Appl. No. 13/336,385; Non-Final Office Action; filed Dec. 23, 2011; dated Aug. 19, 2013; pp. 1-30.
(Continued)

*Primary Examiner* — Michael Alsip
(74) *Attorney, Agent, or Firm* — Cantor Colburn LLP

(57) ABSTRACT

Solid-state storage management for a system, the management including establishing, externally to a solid-state storage board, a correspondence between a first logical address and a first physical address on solid-state storage devices located on the solid-state storage board. The solid-state storage devices include a plurality of physical memory locations identified by physical addresses. The correspondence between the first logical address and the first physical address is accepted by the solid-state storage board. The correspondence between the first logical address and the first physical address is stored in a location on a solid-state memory device that is accessible by an address translator module, the address translator module and the solid-state memory device located on the solid-state storage board. The first logical address is translated to the first physical address by the address translator module based on the previously established correspondence between the first logical address and the first physical address.

1 Claim, 6 Drawing Sheets

(52) U.S. Cl.
CPC ............ *G06F 3/064* (2013.01); *G06F 3/0619* (2013.01); *G06F 3/0652* (2013.01); *G06F 12/0246* (2013.01); *G06F 2212/7201* (2013.01); *G06F 2212/7211* (2013.01)

(56) References Cited

U.S. PATENT DOCUMENTS

| | | |
|---|---|---|
| 7,653,777 B2 | 1/2010 | Tan et al. |
| 8,086,789 B2 * | 12/2011 | Tanaka et al. ................ 711/103 |
| 2008/0320214 A1 | 12/2008 | Ma et al. |
| 2009/0063895 A1 | 3/2009 | Smith |
| 2009/0240873 A1 | 9/2009 | Yu et al. |
| 2010/0118482 A1 | 5/2010 | Kim |
| 2010/0174851 A1 | 7/2010 | Leibowitz et al. |
| 2010/0293319 A1 | 11/2010 | Lim et al. |
| 2010/0332730 A1 | 12/2010 | Royer, Jr. et al. |
| 2011/0041005 A1 | 2/2011 | Selinger |
| 2011/0041039 A1 | 2/2011 | Harari et al. |
| 2011/0060864 A1 | 3/2011 | Yoshii et al. |
| 2011/0099326 A1 | 4/2011 | Jung et al. |
| 2012/0066568 A1 * | 3/2012 | Komagome ................ 714/764 |
| 2012/0079352 A1 * | 3/2012 | Frost et al. ................ 714/767 |
| 2012/0254514 A1 | 10/2012 | Nishikubo |
| 2012/0324143 A1 | 12/2012 | Giganti et al. |
| 2013/0166826 A1 | 6/2013 | Franceschini et al. |

OTHER PUBLICATIONS

Internation Application No. PCT/EP2012/073660; International Search Report and Written Opinion dated Apr. 5, 2013, 12 pages.

* cited by examiner

SOLID-STATE STORAGE MANAGEMENT

CROSS-REFERENCE TO RELATED APPLICATION

This application is a continuation of U.S. patent application Ser. No. 13/336,385, filed Dec. 23, 2011, the content of which is incorporated by reference herein in its entirety.

BACKGROUND

The present invention relates to computer storage, and more specifically, to solid-state storage management.

Solid-state drives (SSDs) are data storage devices that use solid-state memory to store persistent data. SSDs are most commonly connected to a host computer via a high speed link. SSDs usually implement some form of management of the storage medium, i.e., the underlying solid-state storage devices. Such management usually includes translating from a logical address space into a physical address space. Many SSDs use "not-and" (NAND) based flash memory which must be erased in blocks before being rewritten with new data. Address translation is commonly used with NAND flash devices due to the difficulty of erase operations.

In some contemporary systems that use NAND flash devices, all of the management functionality is performed on the host computer. In these systems, the address translation table is placed in the main memory of the host computer such that during a read operation the host computer determines the physical address corresponding to the logical read address (address translation). During a write operation, the host computer decides the physical write address to which the data is written (physical data placement), and logs the logical-to-physical address correspondence in the address translation table. A shortcoming of this approach is that it requires the expenditure of computational cycles and main memory at the host in order to perform the address translation. Thus, it is well-suited for computer systems with large amounts of dynamic random access memory (DRAM) and processing capabilities, and is not well suited for lower cost systems with limited amounts of DRAM and processing capabilities, or for large-scale data-centric systems with high ratios between storage and system memory.

Other contemporary systems place all of the management functionality on the physical SSD board. In this case, SSD does both data placement and address translation. A shortcoming of this approach is that it suffers in terms of cost/performance because it does not leverage the host processor and instead requires another processor to be incorporated into the SSD.

SUMMARY

An embodiment is a system that includes a main board and a solid-state storage board separate from the main board. The main board is coupled to the solid-state storage board via an interface bus. The solid-state storage board includes a solid-state memory device and solid-state storage devices. The solid-state storage devices include a plurality of physical memory locations identified by physical addresses. The system is configured to perform a method that includes establishing a correspondence between a first logical address and a first physical address on the solid-state storage devices. The establishing is by a software module located on the main board. The correspondence between the first logical address and the first physical address is stored in a location on the solid-state memory device located on the solid-state storage board. The method also includes translating the first logical address into the first physical address. The translating is performed by an address translator module located on the solid-state storage board and is based on the previously established correspondence between the first logical address and the first physical address.

Other embodiments include a method and computer program product for establishing a correspondence between a first logical address and a first physical address on solid-state storage devices located on solid-state storage board. The solid-state storage devices include a plurality of physical memory locations identified by physical addresses, and the establishing is by a software module located on a main board that is separate from the solid-state storage board. The main board is coupled to the solid-state storage board via an interface bus. The correspondence between the first logical address and the first physical address is stored in a location on a solid-state memory device that is accessible by an address translator module located on the solid-state storage board. The solid-state memory device is located on the solid-state storage board. The first logical address is translated to the first physical address by the address translator module based on the previously established correspondence between the first logical address and the first physical address.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention provide high performance solid-state drive (SSD) management solutions for use with low-cost or large-scale data-centric computer systems. Specifically, embodiments include an innovative split of flash memory management complexity between a host system and a SSD board, also referred to herein as a hardware module or solid-state storage board. In particular, a host system processor executes a software module that utilizes system resources to perform a specific subset of the tasks involved in SSD management, whereas the remaining tasks are performed and accelerated directly by the SSD board. The hardware module incorporates a controller sub-module, as well as "not-and" (NAND) flash memory and some high speed memory such as dynamic random access memory (DRAM), phase-change memory (PCM) and/or spin-torque transfer random access memory (STT-RAM). The software module handles complex flash memory management operations including, but not limited to: garbage collection, wear leveling, data placement and scheduling, second-tier error correction coding (ECC), redundant array of independent disks (RAID) management, and flash recovery. On the other hand, the hardware controller module handles simple flash translation layer (FTL) bookkeeping (the FTL is the address translation table in NAND-flash systems) and flash command routing, as well as hardware friendly operations such as RAID acceleration and primary-tier ECC using algebraic codes.

Embodiments described herein have very small footprints on the host system and processor in terms of processing power and host memory. Even the most complex flash bookkeeping operations require only a fraction of the computing power of a typical modern host processor, whereas full flash management has a significant impact on system memory occupancy and, as a consequence system performance. Thus, embodiments can be used in systems with inexpensive memory subsystems and relatively inexpensive processors, or systems where power efficiency is a top priority and most of the memory resources will be claimed by the main user application, or large-scale data-centric systems which use several low power compute nodes and/or micro-servers. In addition, the simple hardware module allows low latency and large bandwidth FTL transactions and delivery of flash commands to the flash memory devices. Thus, even on systems running independent concurrent high throughput memory intensive applications, the system and method allows very high performance to be attained. Further, due to the simplicity of hardware this performance is achieved at relatively low costs. The cost/performance of exemplary embodiments in terms of cost/gigabytes (GB), for example, or cost/bandwidth, is significantly better than conventional solutions. Embodiments described herein are well suited for providing high performance at a low cost for systems with limited available resources.

Figure 1:
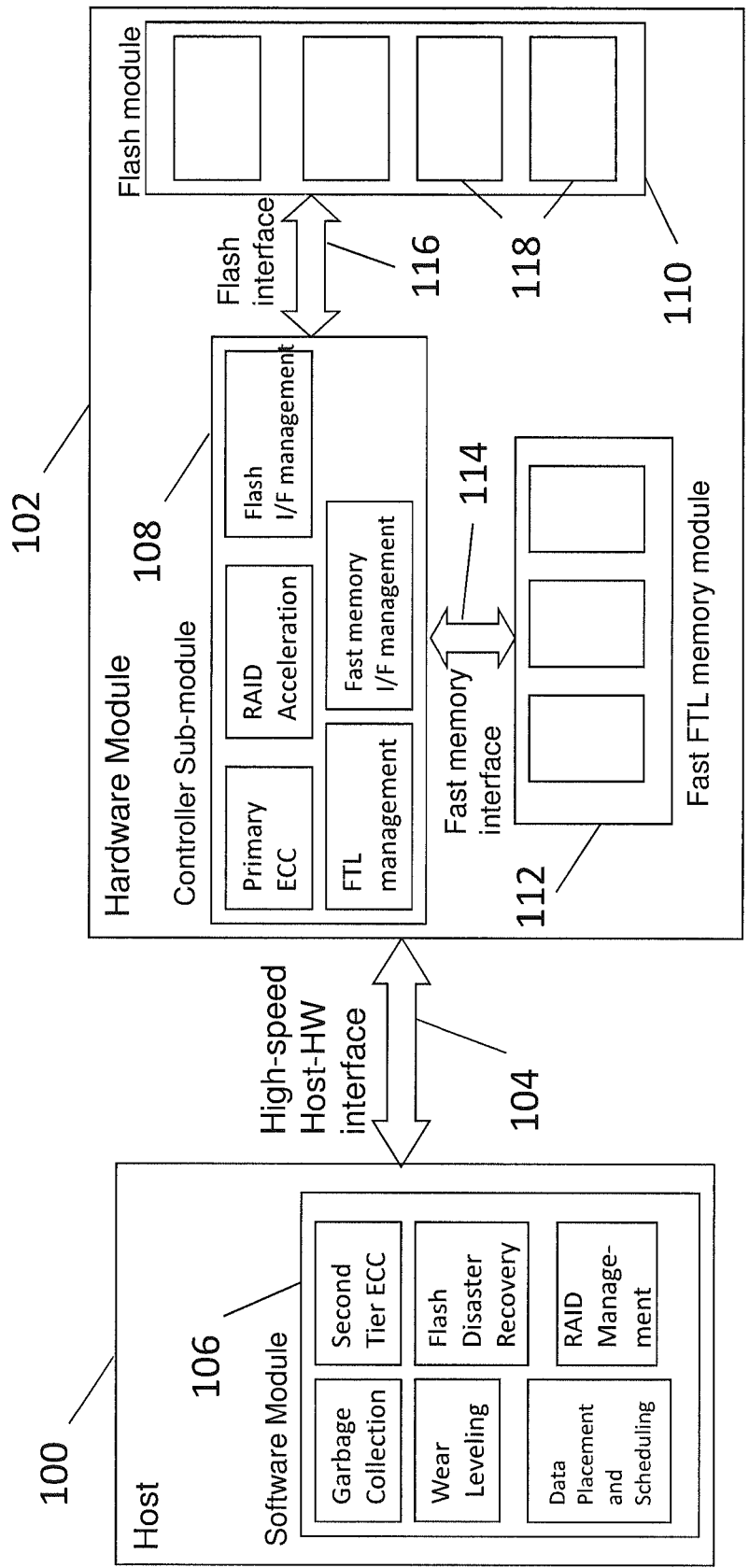
FIG. 1 illustrates a diagram of a flash controller system in accordance with an embodiment of the present invention.

Turning now to FIG. 1, an embodiment of a flash controller system is generally shown. The system includes a host computer 100 connected or coupled to a hardware module 102 by an interface 104. In an embodiment, the host computer 100 is a computer system with a main board and a connection to one or more high-speed buses that serve as the interface 104 to the hardware module 102. The host computer 100 includes hardware located on the main board (e.g., a motherboard), such as a processor and memory, that execute software, including software module 106. In an embodiment, the software module 106 is responsible for most of the complex flash controller management functions such as garbage collection, wear leveling, optimizing data placement and scheduling, RAID management, flash disaster recovery and higher layer ECC functionality.

In an embodiment, the hardware module 102 is a physical device and responsible primarily for housing a flash module 110, a controller sub-module 108 and a fast memory module 112. Herein, the terms "hardware module" and "solid-state storage board" are used interchangeably. In an embodiment, the controller sub-module 108 accesses the FTL, which resides in one or more solid-state memory devices such as a DRAM 112 or some other high speed volatile or nonvolatile memory on the hardware module 102. As known in the art, the FTL includes a mapping between logical addresses and physical addresses. The flash module 110 includes flash memory devices (e.g., chips) 118 that reside on the hardware module 102. A flash memory device is an example of one type of solid-state storage device that may be implemented by exemplary embodiments. Other examples of solid-state storage devices that may be implemented include PCM, magnetic RAM and resistive RAM.

The main functions of the hardware module 102 include the efficient translation of logical-to-physical addresses to facilitate reading from the flash memory devices 118, and low latency and high bandwidth delivery of flash commands to the flash memory devices 118. To this end, the hardware module 102 also incorporates interface management functions, which manage a fast memory interface 114 between a fast FTL memory module 112 and the flash module 110. In addition, the hardware module 102 is responsible for some simple operations suitable for hardware acceleration, that run on the controller sub-module 108 such as primary error correction code (ECC) and some RAID acceleration operations. The controller sub-module 108 is connected to the flash module 110 via a flash interface 116. In addition, the hardware module 102 facilitates the recovery of physical-to-logical address mapping to enable effective operation of management algorithms, including data placement and garbage collection algorithms, as performed by the software module 106. In an embodiment, the hardware module 102 and software module 106 on the host computer 100 are interconnected using interface 104. In an embodiment, interface 104 is a high-speed host hardware interface, such as a high-speed Peripheral Component Interconnect Express (PCIe) interface.

The embodiment depicted in FIG. 1 for SSD management utilizes an innovative split of flash controller management functionality between the software module 106 (e.g., a driver executing on the host computer 100) and the hardware module 102 (e.g., executing on a card with suitable hardware, such as a field programmable gate array or "FPGA", or a controller application specific integrated circuit or "ASIC"). In an embodiment, hardware for acceleration of specific functionalities such as ECC and a table used for translation between logical addresses and physical addresses are in the hardware module 102, and flash management processes such as data placement, wear leveling and control (e.g., based on a wear measurement), and garbage collection, and metadata such as wear data and page status are in the host computer 100. The simplicity of the arrangement and hardware reduces both the cost of the required host computer system and the complexity of the design of hardware module 102. For example, in the embodiment depicted in FIG. 1 the hardware module does not need to implement generic processor core functionality, as commonly done in the art.

The split of the flash controller functionality between the host computer 100 and hardware module 102 allows very high performance to be attained. This is due to the software module 106 on the host computer 100 controlling the complex flash operations, where the host computer 100 has sufficient computing system resources for the operations. This is in contrast to performing complex flash operations entirely on the hardware module 102, where resources on the hardware module 102 may cause a bottleneck for complex operations. The arrangement depicted in FIG. 1 also saves costly system resources, such as main memory on the host computer 100, by placing the FTL memory module 112 on the hardware module 102. Thus, embodiments are used to facilitate high performance flash I/O in new applications, such as micro-servers in data-center networking, where system resources such as main memory are constrained, and allow accelerated development due to the simplicity of the hardware module 102. A description of how exemplary flash operations are performed according to embodiments is shown in FIGS. 2-6.

Figure 2:
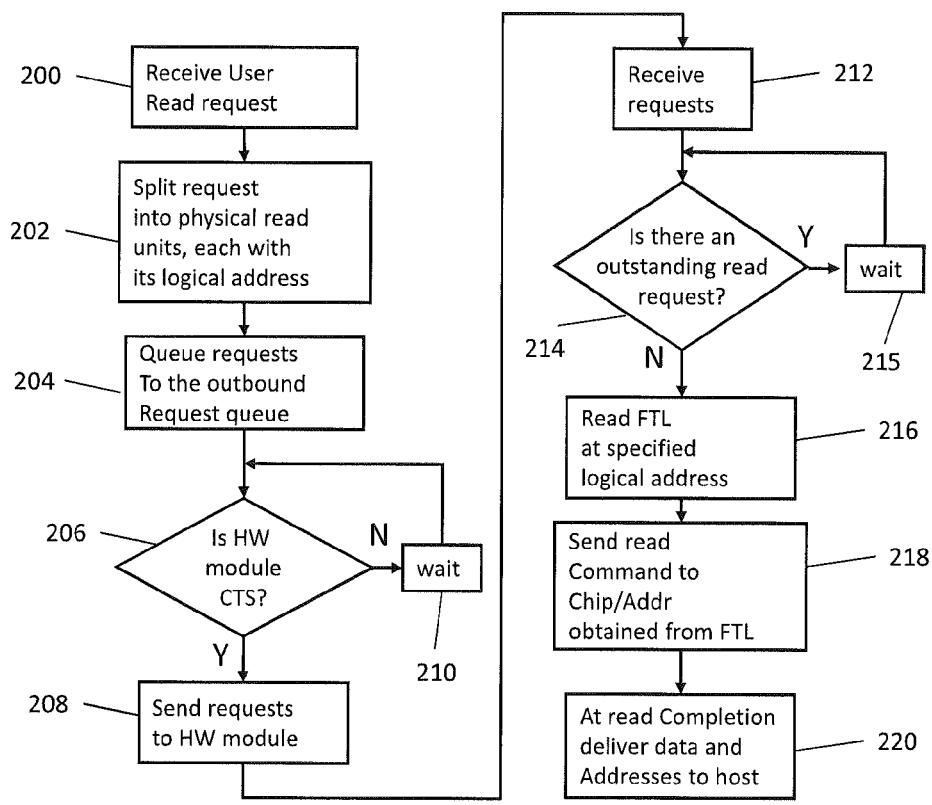
FIG. 2 illustrates a diagram of a process for performing a read flash operation in accordance with an embodiment of the present invention.

FIG. 2 is a block diagram of a process for performing a read flash operation (also called read logical address flash operation) according to an embodiment. In a first block 200, a user read request for a SSD, such as a flash memory device 118, is received by the host computer 100. At block 202, the read request is split into physical read units, where each unit has its own logical address. The requests are then queued to an outbound request queue in block 204. At block 206, the hardware module 102 is checked, either directly, or by inferring its status given the previous history of commands and requests and the capabilities of the hardware module 102 itself, to see if it is cleared to send (CTS) the read requests. The hardware module 102 indicates CTS if it is free to perform or accept commands. If the hardware module 102 is CTS, the requests are sent to the hardware module 102, as shown in block 208. In block 210, if the module is not cleared, the system will wait until the hardware module 102 indicates it is clear. In an embodiment, blocks 200-210 are performed by the host computer 100, and blocks 212-220 are performed by the hardware module 102.

In block 212, the read requests for each of the logical addresses are received. In block 214, the hardware module 102 determines if there is an outstanding read request, for example at the same hardware resource (possible hardware resources include a flash module, a memory device or chip, a die, of plane) where the read operation has to be performed. If there are outstanding read requests, the module waits, as shown in block 215. If there are no outstanding read requests, block 216 is performed to read the fast FTL memory module 112 (also referred to as "FTL") at the specified logical address to determine the physical address that corresponds to the logical address. At block 218, a read command is sent to the physical address obtained from the FTL. The FTL performs the translation of the logical address to the physical address on the hardware module 102. In block 220, after the read is completed, the data is delivered along with the logical address by the hardware module 102 to the host computer 100 via the interface 104. In another embodiment, the physical address is also sent to the host computer 100 via the interface.

Figure 3:
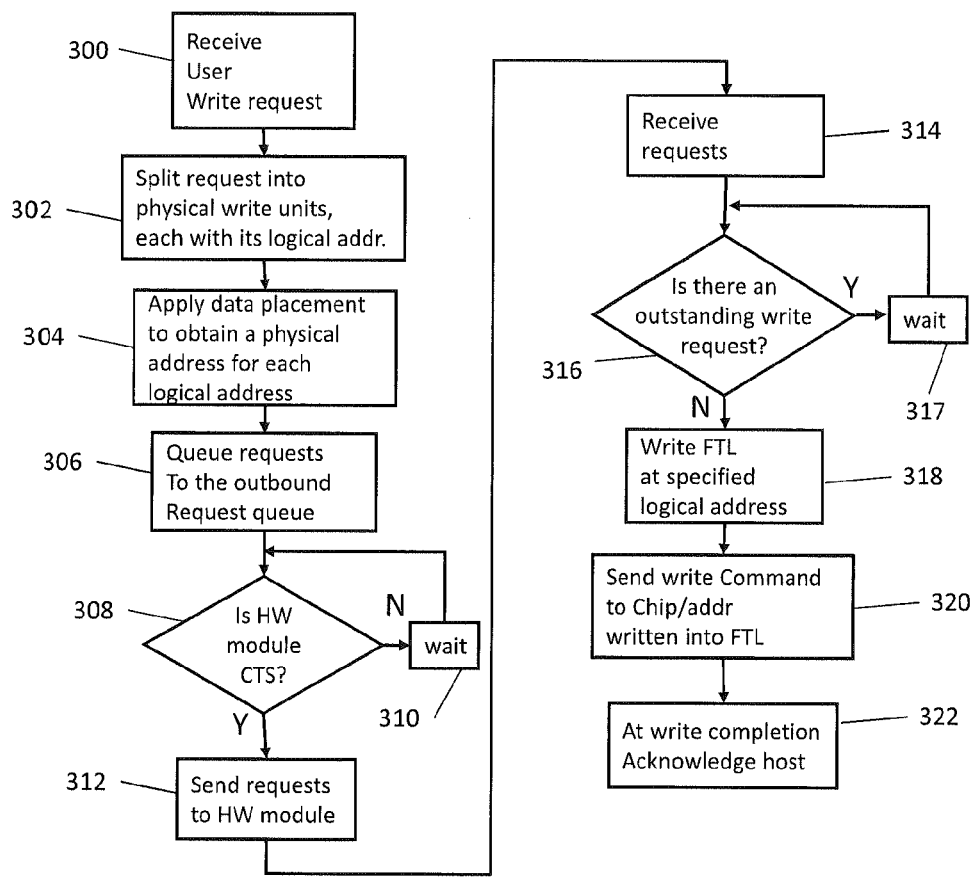
FIG. 3 illustrates a diagram of a process for performing a write flash operation in accordance with an embodiment of the present invention.

FIG. 3 is a block diagram of a process for a write flash operation according to an embodiment. At block 300, the host computer 100 receives a user write request. In block 302, the write request is split into physical write units, where each unit has a logical address. At block 304, a data placement algorithm obtains a physical address for each logical address. The data placement algorithm executes on the host computer 100 software module 106 and determines the physical address based on selected data (e.g., metadata) on the host computer 100, such as wear information and other flash device information. In an embodiment, the physical write location determined by the placement algorithm is selected so as to equalize wear across different physical locations, using determination algorithms well known in the art. In another embodiment, the physical location determined by the placement algorithm is such as to reduce write amplification from future garbage collection operations; the algorithms to determine such a physical location are well-known in the art. In another embodiment the solid-state storage devices include a mixture of devices with different performance characteristics, for example single-level cell (SLC) and multi-level cell (MLC) flash. In this case the placement algorithm takes the physical characteristics of devices into account while determining the physical location. For example, data that is expected to be rewritten frequently is placed on a high-endurance device such as SLC flash, while infrequently updated data is placed on low-endurance devices such as MLC flash. In an embodiment, establishing a correspondence between a logical address and a physical address is responsive to at least one of a measurement of wear of at least one of the solid-state storage devices, projected performance of the main board, and characteristics of at least one of the solid-state storage devices. In an embodiment, establishing a correspondence between a logical address and a physical address is responsive to prior output of an ECC decoder. Thus, information about the location of prior errors is taken into account when deciding on a physical location for the data.

The requests are then queued at an outbound request queue in block 306. In block 308, the hardware module 102 is checked to see if it is CTS the write requests. In block 310, if the module is not cleared, the system will wait until the hardware module 102 indicates it is clear. If the hardware module 102 is CTS, the requests, including the data to be written along with the logical and physical addresses, are sent to the hardware module 102, as shown in block 312. In an embodiment, blocks 300-312 are performed by the host computer 100, and blocks 314-322 are performed by the hardware module 102.

At block 314, the write requests for each of the logical and physical addresses are received. In block 316, the hardware module 102 determines if there are outstanding write requests, for example at the same hardware resource (possible hardware resources include a flash module, a memory device or chip, a die, of plane) where the write operation has to be performed. If there are outstanding write requests, the module waits, as shown in block 317. If there are no outstanding write requests, the hardware module 102 writes to update the FTL at the specified logical address for each physical address, as shown in block 318. At block 320, the write command is sent to the flash memory device or physical address of the memory, where the physical address matches the address written into the FTL in block 318. In block 322, a write completion acknowledgement is sent to the host computer 100.

Figure 4:
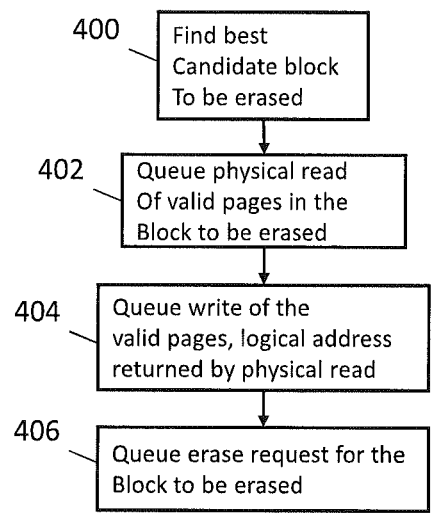
FIG. 4 illustrates a diagram of a process for performing a garbage collection flash operation in accordance with an embodiment of the present invention.

FIG. 4 is a block diagram of process for a garbage collection operation in accordance with an embodiment. At block 400, the host computer 100 finds the best candidate block of data to erase during the operation. In an embodiment, the best candidate is the block with the least number of valid pages. In another embodiment, the candidate is selected because it has the least amount of wear. The host computer 100 may use metadata and other information stored on the host computer 100 that describes flash memory properties to identify the candidate for the erasing operation. Further, the metadata on the host computer 100 also provides the physical addresses of the block of data selected for erasing. Metadata stored at the host includes one or more of the following: valid status of each physical page, status of each block, possibly including current write page, erase status, erase count, either precise or approximate, and current operation being performed if any. In an embodiment this information is processed by an independent thread of execution. In additional embodiments this information is processed when a garbage collection operation is triggered.

Figure 5:
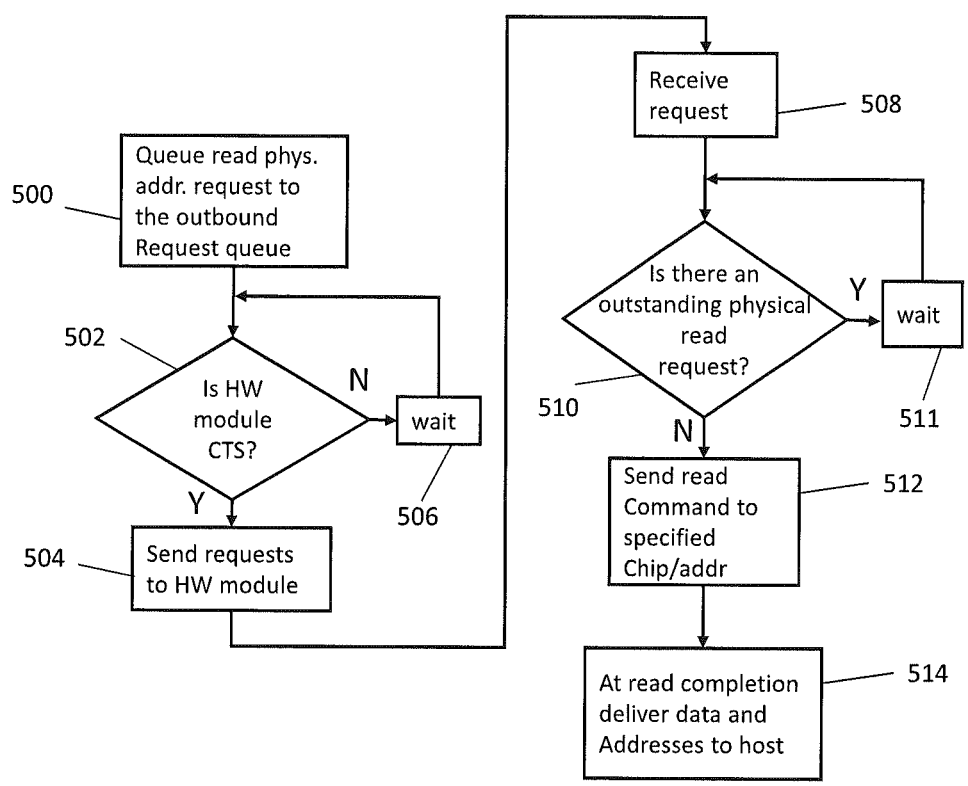
FIG. 5 illustrates a diagram of a process for performing a read physical address flash operation in accordance with an embodiment of the present invention.

At block 402, a read physical address flash operation, such as that described below in FIG. 5, is queued for any valid pages within the block of data identified at block 400. In an embodiment, the physical addresses of the valid pages are determined using an offset value from the starting physical address of the block of data to be erased by the garbage collection process. The physical addresses of the valid pages to be erased are queued, and at block 404, the write of the valid pages and logical addresses returned by the physical read are queued. The logical address associated to a physical page is obtained from metadata appended to the page contents at write time and retrieved alongside with the page contents when performing a read operation. At block 406, the erase requests for the block of data to be erased are queued after all the valid pages have been written (i.e., copied) in block 404 to another location. The process maintains the logical address as the physical addresses of valid pages are changed, where the FTL is updated with the new address for the data. In an embodiment, the processing depicted in FIG. 4 is performed by the host computer 100.

FIG. 5 is a block diagram of a process for a read physical address flash operation according to an embodiment. At block 500, a request for reading data from a physical address is queued to the outbound request queue of the host computer 100. At block 502, the hardware module 102 is checked to see if it is CTS the read requests. At block 506, if the module is not cleared, the system will wait until the hardware module 102 indicates it is clear. If the hardware module 102 is cleared to send, the read requests and corresponding physical addresses are sent to the hardware module 102, as shown in block 504. In an embodiment, blocks 500-504 are performed by the host computer 100, and blocks 508-514 are performed by the hardware module 102.

In block 508, the read requests for each of the physical addresses are received. At block 510, the hardware module 102 determines if there is an outstanding physical address read request. If there are outstanding read requests, the module waits, as shown in block 511. If there are no outstanding requests, the read command is sent to the specified physical address in block 512. After the data has been read at the specified physical address, the data and the logical address are delivered to the host computer 100 by the hardware module 102. The read physical address operation may be performed when the host computer 100 knows the physical address of the data it is requesting, such as for a garbage collection operation as described above in FIG. 4.

In additional exemplary embodiments, only an acknowledgment is provided to the host computer 100 after the data is read. The read data is stored on the hardware module 102, for example in a buffer on the controller sub-module 108 or in other memory available at the hardware module 102. In additional embodiments the logical address associated with the page read is communicated back to the host computer 100. In additional embodiments the logical address is stored in a buffer available at the hardware module 102. Whenever the data is stored in a buffer at the hardware module 102, the write operation required to save the page to be erased does not include transferring the page data from the host computer 100, but only requesting that the data used in the write operation is obtained from the buffer at hardware module 102.

Figure 6:
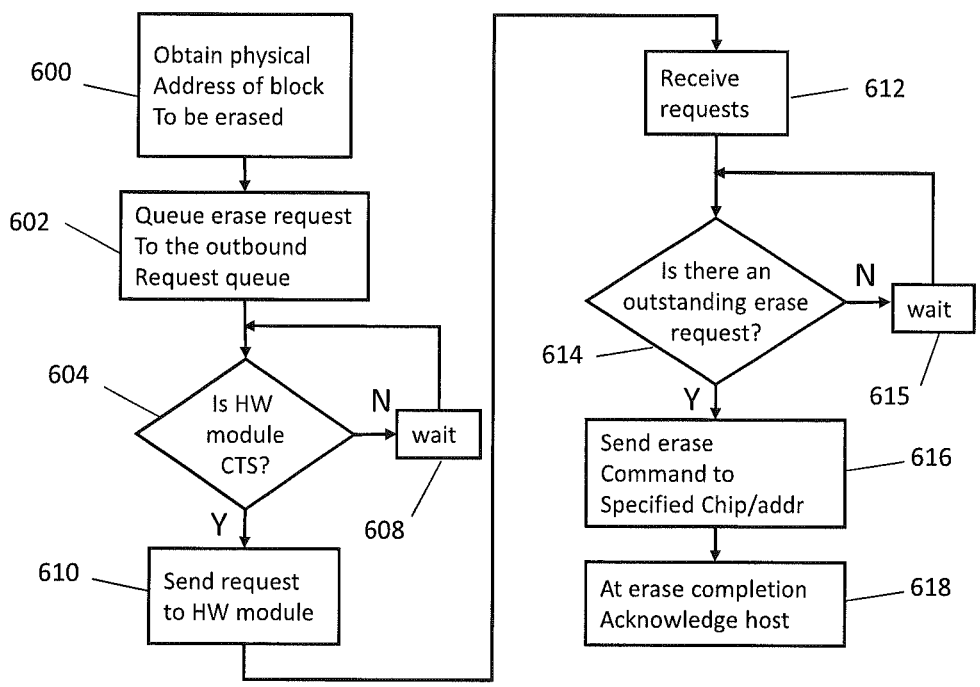
FIG. 6 illustrates a diagram of a process for performing a flash erase operation in accordance with an embodiment of the present invention.

FIG. 6 is a block diagram of a process for a flash erase operation according to an embodiment. At block 600, a physical address of the block of data in the flash to be erased is obtained. At block 602, the erase request is sent to the outbound request queue. At block 604, the hardware module 102 is checked to see if it is CTS the erase request. At block 608, if the module is not cleared, the system will wait until the hardware module 102 indicates it is clear. If the hardware module 102 is cleared to send, the erase requests and corresponding physical addresses are sent to the hardware module 102, as shown in block 610. In an embodiment, blocks 600, 602, 604, 608 and 610 are all performed by the host computer 100, and blocks 612, 614, 616 and 618 are performed by the hardware module 102.

At block 612, the erase requests for each of the physical addresses are received. At block 614, the hardware module 102 determines if there is an outstanding erase requests. If there are no outstanding erase requests, the module waits, as shown in block 615. If there is an outstanding request, the erase command is sent to the specified physical address and flash memory device 118 at block 616. After the data has been erased at the specified physical address, an acknowledgement of the erased data is communicated to the host computer 100 by the hardware module 102. The erase operation may be performed when the host computer knows the physical address of the data it is requesting to erase, such as for a garbage collection operation as described above in FIG. 4.

Embodiments provide a high performance solid-state device management solution that can be used with low cost volume processors. Specifically, embodiments include a split of flash management complexity between a software module running on a host processor and a hardware module that includes the flash memory. In embodiments, the host processor and system are located on a main board of a computer system which the hardware module is a card that includes the flash memory, a controller sub-module and a fast memory module. The fast memory module (including the FTL) on the hardware module hosts information used for logical to physical address translation (e.g., a table) to provide fast read operation performance. By placing the address translation information on the hardware module, valuable memory on the host is saved. Other metadata describing the flash memory is located on the host to utilize the host processor. Operations performed on the host using the metadata on the host utilize the host processor and do not negatively impact the performance of the hardware controller connected to the flash. The division of data and operations between the host and hardware module also simplifies the system while reducing cost by not having a processor on the module.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product comprising:
a non-transitory computer readable storage medium having computer readable program code embodied therewith, the computer readable program code executable by a processor to cause the process to perform:
receiving a write request that includes a first logical address and write data;
establishing, externally to a solid-state storage board by a main board, a correspondence between the first logical address and a first physical address on flash memory devices located on the solid-state storage board, the solid state storage board including an address translation module, the flash memory devices including a plurality of physical memory locations identified by physical addresses, the flash memory devices including a first flash memory device, the solid-state storage board being coupled to the main board via an interface bus, the main board being located on a host computer,
wherein the establishing of the correspondence between the first logical address and the first physical address is responsive to the write request;
accepting, by the solid-state storage board, the correspondence between the first logical address and the first physical address;
storing the correspondence between the first logical address and the first physical address in a location on a solid-state memory device that is accessible by an address translator module, the address translator module and the solid-state memory device located on the solid-state storage board;
receiving a status request of the solid-state storage board and determining whether a request to read data is clear to send in response to the status request of the solid-state storage board, wherein the request includes the first logical address;
facilitating a read physical address flash operation from the first flash memory device and providing low latency and high bandwidth delivery of flash commands to the first flash memory device by:
translating the first logical address to the first physical address,
the address translation module performing acceleration operations with respect to translations between logical addresses and physical addresses,
the translating being performed in response to receiving the request to read the data,
wherein the acceleration operations include utilizing an error correction coding of an error correction code decoder and a table to support the translations between logical addresses and physical addresses,
wherein the translating is performed in response to receiving the request to read the data, the request including the first logical address;
retrieving the valid pages within the data from the first physical address,
wherein the establishing of the correspondence between the first logical address and the first physical address is responsive to a projected performance of the main board and characteristics of the first flash memory device to account for a location of prior errors outputted by the error correction code decoder; and
writing the write data in the first flash memory device into a physical location identified by the first physical address,
wherein the acceleration operations include the primary error correction code and redundant array of independent disks acceleration operations to support the writing of the write data and to avoid implementing a second portion of the management complexity by the solid-state storage board,
wherein the acceleration operations includes a garbage collection operation comprising:
finding a best candidate to erase during the garbage collection operation, the best candidate is a block with a least number of valid pages,
queuing a read physical address flash operation for the valid pages within the block, and
queuing physical addresses of the valid pages to be erased, and
queuing a write of the valid pages and logical addresses returned by a physical read.

* * * * *